United States Patent
Oguz et al.

(10) Patent No.: US 12,491,839 B2
(45) Date of Patent: Dec. 9, 2025

(54) SYSTEM FOR DETECTING THE INTENTION OF A USER TO OPEN A HATCH OF A VEHICLE

(71) Applicant: VALEO COMFORT AND DRIVING ASSISTANCE, Créteil (FR)

(72) Inventors: Onur Oguz, Créteil (FR); Georges Djokic, Créteil (FR); Kawtar Es-Saghir, Créteil (FR); Eloi Desbazeilles, Créteil (FR); Jean-Claude Goumy, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 231 days.

(21) Appl. No.: 18/364,052

(22) Filed: Aug. 2, 2023

(65) Prior Publication Data
US 2024/0042965 A1 Feb. 8, 2024

(30) Foreign Application Priority Data

Aug. 2, 2022 (FR) ...................................... 2208030

(51) Int. Cl.
*B60R 25/25* (2013.01)
*B60R 25/20* (2013.01)
*B60R 25/24* (2013.01)

(52) U.S. Cl.
CPC .......... *B60R 25/257* (2013.01); *B60R 25/209* (2013.01); *B60R 25/245* (2013.01); *B60R 2325/205* (2013.01)

(58) Field of Classification Search
CPC ... B60R 25/257; B60R 25/209; B60R 25/245; B60R 2325/205
USPC ........................................................ 340/5.72
See application file for complete search history.

(56) References Cited

U.S. PATENT DOCUMENTS

| | | | |
|---|---|---|---|
| 2004/0201451 A1* | 10/2004 | Sugimoto | B60R 25/406 340/5.62 |
| 2016/0251890 A1* | 9/2016 | Sakai | G07C 9/00309 340/5.72 |
| 2017/0253216 A1* | 9/2017 | Nishidai | H04M 1/72412 |
| 2017/0342750 A1* | 11/2017 | Hiramine | G07C 9/00309 |
| 2019/0176759 A1* | 6/2019 | Heinrich | B60R 25/245 |
| 2022/0012968 A1* | 1/2022 | Hartman | G06V 40/20 |

* cited by examiner

*Primary Examiner* — Kam Wan Ma
(74) *Attorney, Agent, or Firm* — Osha Bergman Watanabe & Burton LLP

(57) ABSTRACT

A system for detecting an intent to open a hatch of a vehicle includes an identifier having means for recording the intent to open a hatch, where the identifier authenticates itself with an electronic control unit, and receives from the ECU a request for confirmation of intent to open a hatch. Following receipt of the request for confirmation of intent to open a hatch, the existence of a command confirming intent to open a hatch in a memory in the identifier is verified. When the command is initiated, a command signal is sent corresponding to the command confirming intention to open a hatch. The electronic control unit is integrated in the vehicle and authenticates the identifier, locates the identifier in proximity to the hatch, sends the request for confirmation of intent to open a hatch, and receives the command signal corresponding to the command confirming intent to open a hatch.

15 Claims, 4 Drawing Sheets

SYSTEM FOR DETECTING THE INTENTION OF A USER TO OPEN A HATCH OF A VEHICLE

Figure 1:
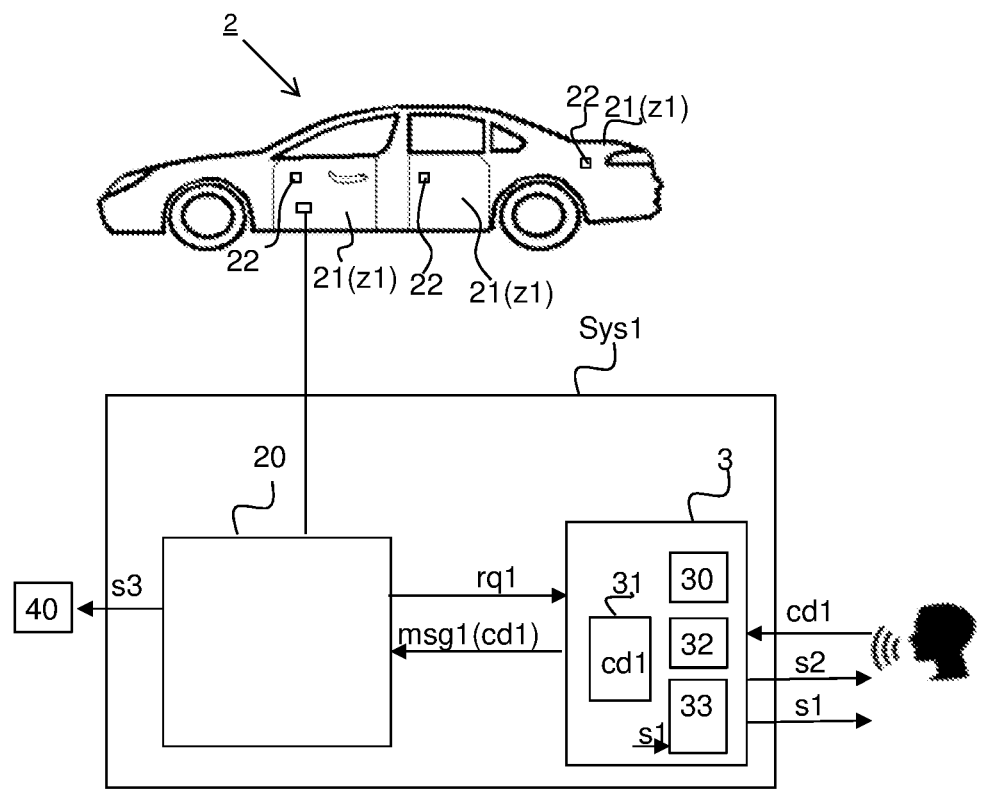

The present invention relates to a system for detecting the intention of a user to open a hatch of a vehicle. It is particularly but non-limitingly applicable to motor vehicles.

In the field of motor vehicles, one system for detecting the intention of a user to open a hatch of a vehicle, known to those skilled in the art, comprises one or more dedicated movement sensors, such as a sensor of movement of the foot or "kick sensor".

One drawback of this prior art is that such movement sensors are very sensitive to the least movement and may detect spurious movements such as a cat passing, causing a hatch such as the boot lid or tailgate of the motor vehicle to open undesirably. Thus, this generates cases of false positives (case of a cat passing), or cases of false negatives (case where passage of the foot is not recognized when it passes too far from the sensor).

In this context, the present invention aims to provide a system for detecting the intention of a user to open a hatch of a vehicle that allows the mentioned drawback to be resolved.

To this end, the invention provides a system for detecting the intention of a user to open a hatch of a vehicle, characterized in that said detecting system comprises:
(a) an identifier comprising means for recording intention to open a hatch and being configured to:
authenticate itself with an electronic control unit,
when it is located in a region of proximity around said hatch, receive from said electronic control unit a request for confirmation of intention to open a hatch,
following receipt of said request for confirmation of intention to open a hatch, verify the existence of a command confirming intention to open a hatch in a memory in the identifier,
if said command confirming intention to open a hatch exists, send to the electronic control unit a command signal corresponding to said command confirming intention to open a hatch,
if said command does not exist, send a data signal to a user of said identifier to initiate said command confirming intention to open a hatch via said means for recording intention to open a hatch,
when said command confirming intention to open a hatch is initiated, send to said electronic control unit a command signal corresponding to said command confirming intention to open a hatch,
(b) said electronic control unit being integrated in said vehicle and being configured to:
authenticate said identifier,
locate said identifier in a region of proximity around said hatch,
when said identifier is located in said region of proximity, send to said identifier said request for confirmation of intention to open a hatch,
receive said command signal corresponding to said command confirming intention to open a hatch.

Thus, as will be seen in detail below, by replacing movement detection with detection of the existence of a command confirming intention to open a hatch recorded in a memory of an identifier, or with initiation of such a command by the user of said identifier via means for recording intention to open a hatch, the identifier allows the intention of the user to be 100% confirmed and thus cases of false positives and false negatives to be prevented. Moreover, removing the one or more movement sensors allows the cost of the detecting system to be decreased.

According to non-limiting embodiments, said system for detecting the intention of a user to open a hatch of a vehicle may further comprise one or more of the following additional features, implemented alone or in any technically possible combination.

According to one non-limiting embodiment, said electronic control unit is further configured to open or not open said hatch depending on said command signal.

According to one non-limiting embodiment, said command confirming intention to open a hatch is pre-recorded in the identifier. In particular, it is pre-recorded in said memory of the identifier.

According to one non-limiting embodiment, said command confirming intention to open a hatch is a voice message or a confirmation value.

According to one non-limiting embodiment, said command signal is said command confirming intention to open a hatch.

According to one non-limiting embodiment, said command signal is a confirmation value when the command confirming intention to open a hatch is a voice message.

According to one non-limiting embodiment, said means for recording intention to open a hatch are:
a microphone, or
an application, or
at least one button.

According to one non-limiting embodiment, when said identifier enters the region of proximity around said hatch, said identifier is further configured to send a warning signal to a user of said identifier.

According to one non-limiting embodiment, if said electronic control unit does not receive a command signal from said identifier, it is further configured to consider the command signal as corresponding to a negative command confirming intention to open a hatch.

According to one non-limiting embodiment, said identifier is an identifier of hands-free access of said vehicle for accessing and/or starting said vehicle hands free.

According to one non-limiting embodiment, said hatch is a boot lid or tailgate or a door of said vehicle.

According to one non-limiting embodiment, said identifier is a key, a smartphone, or a connected object.

According to one non-limiting embodiment, the confirming command is positive or negative. When it is positive, it confirms the intention of the user to open a hatch. When it is negative, it confirms her or his intention not to open it.

According to one non-limiting embodiment, a region of proximity occupies about 1.5 metres around said corresponding hatch.

According to one non-limiting embodiment, the data signal is sent to an interface of said identifier.

According to one non-limiting embodiment, said electronic control unit is further configured to check whether it has already sent the request for confirmation of intention to open a hatch to said identifier.

According to one non-limiting embodiment, said electronic control unit is further configured to locate said identifier in an unlocking region.

According to one non-limiting embodiment, when said identifier is located in said unlocking region, said electronic control unit is further configured to unlock said hatch if said hatch is locked. This allows it to be opened subsequently.

According to one non-limiting embodiment, said detecting method further comprises said electronic control unit checking whether it has already sent said request for confirmation of intention to open a hatch to said identifier.

An identifier for a vehicle is further provided, said identifier being configured to interact with an electronic control unit, said identifier comprising means for recording intention to open a hatch and being configured to:
- authenticate itself with said electronic control unit, the latter being integrated in a vehicle,
- when it is located in a region of proximity around a hatch of said vehicle, receive from said electronic control unit a request for confirmation of intention to open a hatch,
- following receipt of said request for confirmation of intention to open a hatch, verify the existence of a command confirming intention to open a hatch in a memory in the identifier,
- if said command confirming intention to open a hatch exists, send to the electronic control unit a command signal corresponding to said command confirming intention to open a hatch,
- if said command does not exist, send a data signal to a user of said identifier to initiate said command confirming intention to open a hatch via said means for recording intention to open a hatch,
- when said command confirming intention to open a hatch is initiated, send to said electronic control unit a command signal corresponding to said command confirming intention to open a hatch.

An electronic control unit configured to interact with an identifier is further provided, said electronic control unit being integrated in a vehicle and being configured to:
- authenticate said identifier,
- locate said identifier in region of proximity around a hatch of said vehicle,
- when said identifier is located in said region of proximity around said hatch, send to said identifier a request for confirmation of intention to open a hatch,
- receive from said identifier a command signal relating to a command confirming intention to open a hatch.

A method for detecting the intention of a user to open a hatch of a vehicle is further provided, said vehicle comprising an electronic control unit configured to interact with an identifier, characterized in that said detecting method comprises:
- said electronic control unit authenticating said identifier,
- said electronic control unit locating said identifier in a region of proximity around said hatch,
- when said identifier is located in said region of proximity around said hatch, said electronic control unit sending to said identifier a request for confirmation of intention to open a hatch and said identifier receiving said request for confirmation of intention to open a hatch,
- on receipt of said request for confirmation of intention to open a hatch, said identifier verifying the existence of a command confirming intention to open a hatch in a memory in the identifier and, if said command exists, sending to said electronic control unit a corresponding command signal,
- if said command does not exist, said identifier sending a data signal to a user of said identifier to initiate said command confirming intention to open a hatch via said means for recording intention to open a hatch,
- when said command confirming intention to open a hatch is initiated, said identifier sending to said electronic control unit a command signal corresponding to said command confirming intention to open a hatch,
- said electronic control unit receiving said command signal.

Figure 2:
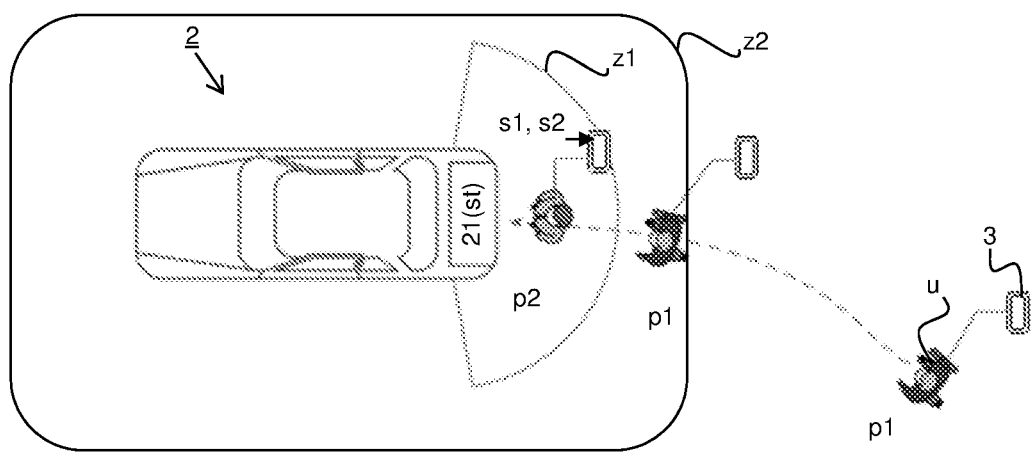
Figure 3:
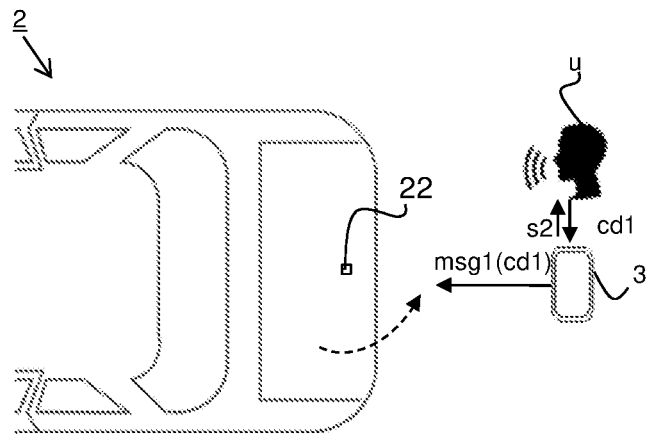
Figure 4:
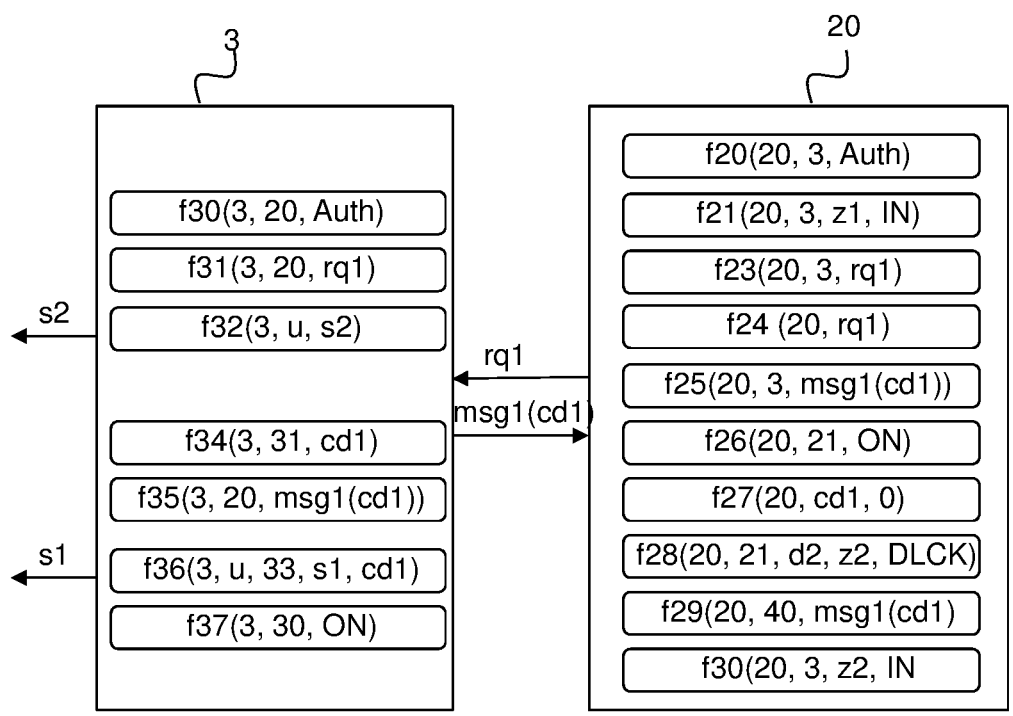
Figure 5:
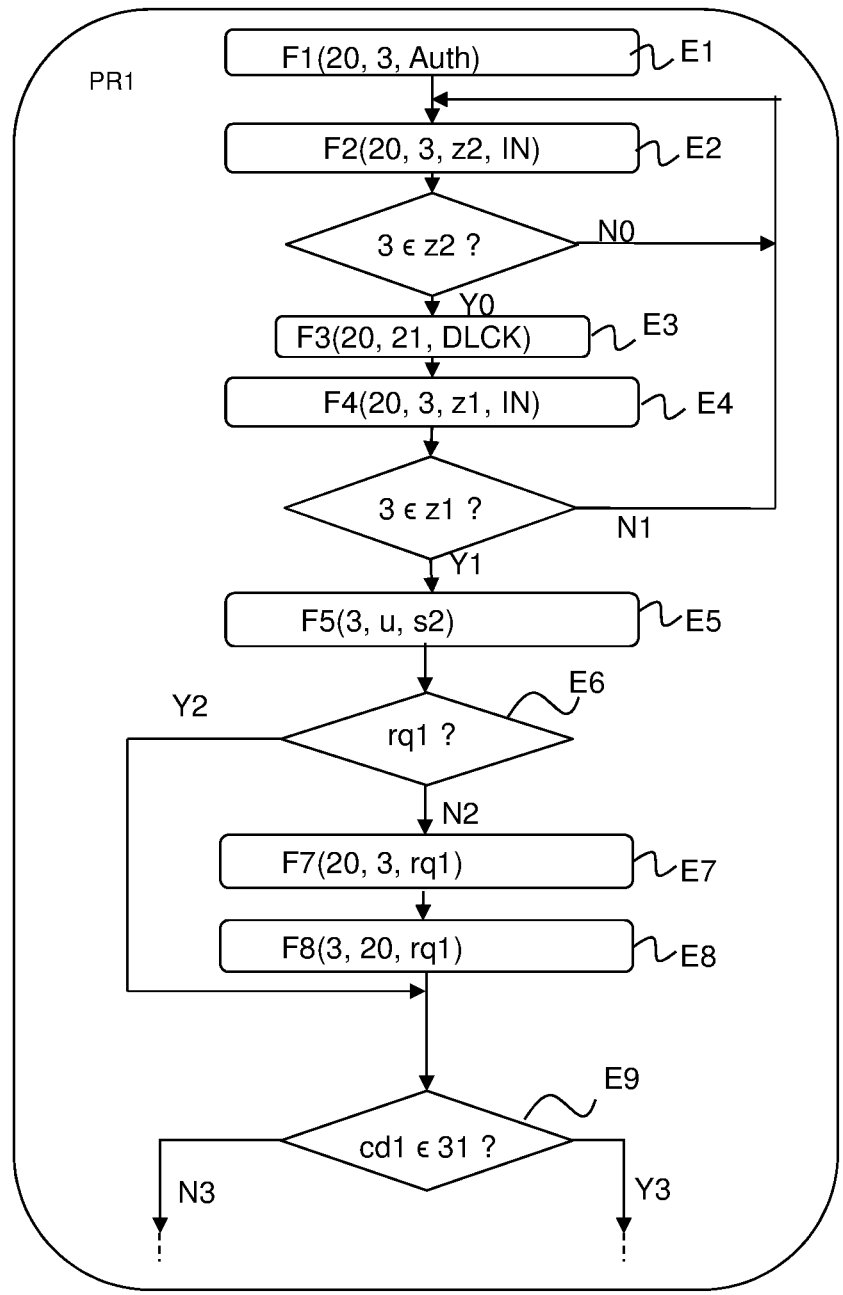
Figure 6:
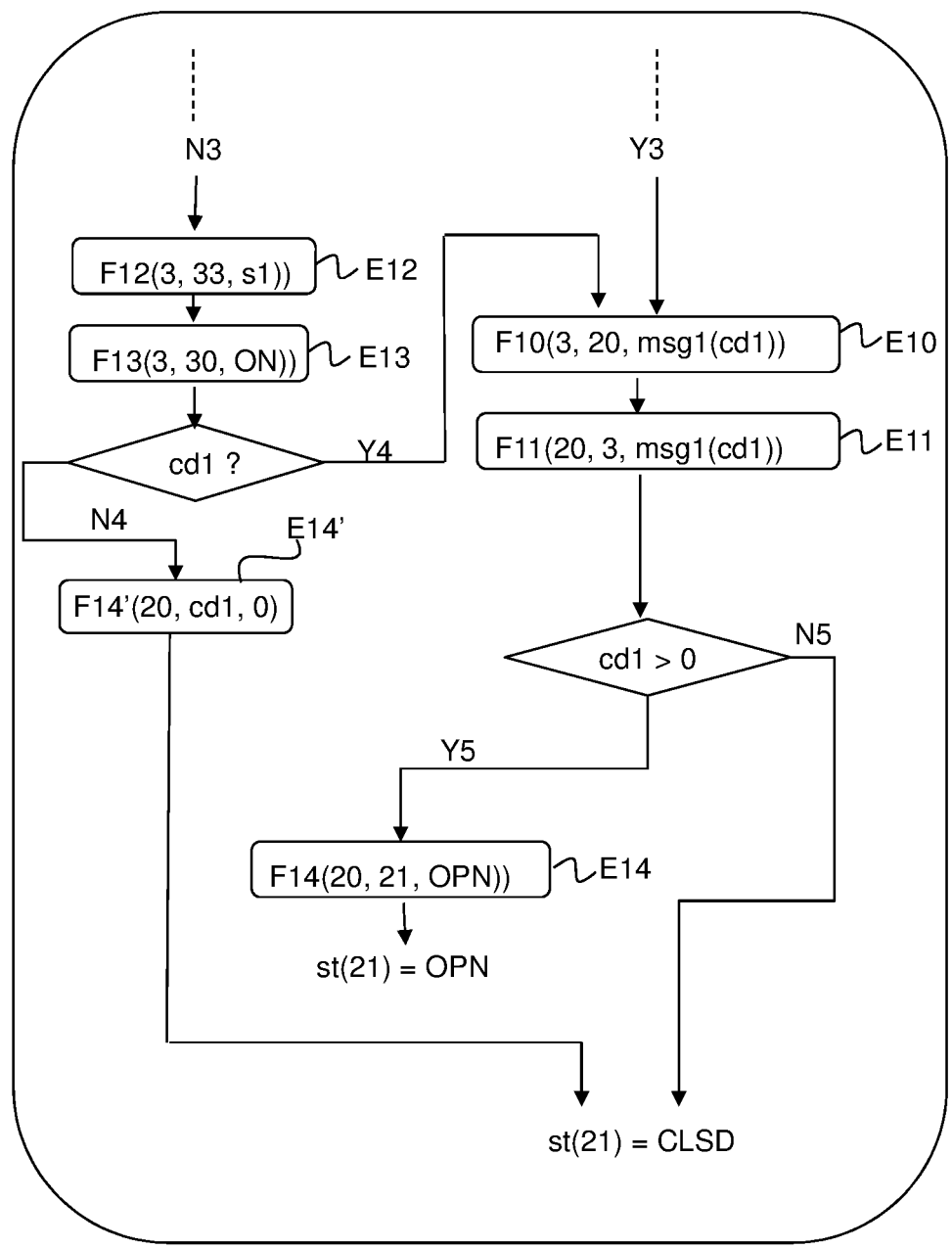

The invention and the various applications thereof will be better understood on reading the following description and on examining the accompanying figures, in which:

FIG. 1 is a schematic view of a system for detecting the intention of a user to open a hatch of a vehicle, said detecting system comprising an identifier and an electronic control unit integrated in said vehicle, according to one non-limiting embodiment of the invention, FIG. 2 illustrates a user bearing/wearing said identifier of FIG. 1 approaching a vehicle and entering a region of proximity around a hatch of said vehicle, according to one non-limiting embodiment, FIG. 3 illustrates said user sending a command confirming intention to open a hatch that is a voice message, said voice message being received by a microphone of said identifier of FIG. 2, according to one non-limiting embodiment, FIG. 4 illustrates said identifier of FIG. 1 and its functions and said electronic control unit of FIG. 1 and its functions, according to one non-limiting embodiment, FIG. 5 is a flowchart of a method for detecting the intention of a user to open a hatch of a vehicle, said detecting method being implemented by the detecting system of FIG. 1, according to one non-limiting embodiment, FIG. 6 illustrates the rest of the flowchart of the detecting method of FIG. 5, according to one non-limiting embodiment.

Elements that are identical, in structure or in function, and that appear in more than one figure, have been designated by the same reference signs, unless otherwise indicated.

The system Sys1 for detecting the intention of a user to open a hatch of a vehicle, according to the invention, will now be described with reference to FIGS. 1 to 4. It is also referred to as detecting system Sys1. In one non-limiting embodiment, the vehicle 2 is a motor vehicle. By motor vehicle, what is meant is any type of motorized vehicle. This embodiment is taken as non-limiting example throughout the remainder of the description. Throughout the remainder of the description, the vehicle 2 is thus also called motor vehicle 2.

The motor vehicle 2 comprises a plurality of hatches 21. In some non-limiting embodiments, a hatch 21 is a boot lid or tailgate or a door of said motor vehicle 2. The door may open laterally or be a sliding door or a side door that opens vertically. With each hatch 21 is associated a region of proximity z1 about said hatch 21. In one non-limiting embodiment, a region of proximity z1 occupies about 1.5 metres around said corresponding hatch 21. For the sake of clarity, in FIG. 2 only the region of proximity z1 corresponding to the boot lid/tailgate has been shown. Each hatch 21 has a reference state (st in FIG. 2) that is either open (referenced OPN in FIG. 6) or closed (referenced CLSD in FIG. 6).

As illustrated in FIG. 1, the detecting system Sys1 comprises:
- an identifier 3, and
- an electronic control unit 20 integrated in the motor vehicle 2.

In one non-limiting embodiment, the identifier 3 is an identifier of hands-free access for accessing and/or starting said motor vehicle 2 hands free. Thus, the identifier 3 may be used for a PEPS application (PEPS standing for Passive Entry Passive Start) allowing a user u of the motor vehicle 2 to unlock/lock and start the motor vehicle 2 by virtue of this identifier 3 without physically inserting said identifier 3 into a lock of said motor vehicle 2 to unlock/lock it or into an ignition switch of said motor vehicle 2 to start it. Thus, when it is located in proximity to the motor vehicle 2, the hatches 21 may be unlocked, and when it is located inside the motor vehicle 2, the engine or motor of the motor vehicle 2 may be started.

In non-limiting embodiments, said identifier 3 is a smartphone or a key or a connected object such as wireless earphones or even a smartwatch. The smartphone or connected object is thus used as a key to access and/or start the motor vehicle 2.

In one non-limiting embodiment, the electronic control unit 20, or ECU, is configured to communicate with the identifier 3 via the BLE communication protocol (BLE standing for Bluetooth Low Energy). To this end, it comprises a BLE communication module for communicating with a corresponding BLE communication module of the identifier 3 to authenticate said identifier 3 and to communicate the confirmation request rq1, confirming command cd1 and command signal msg1 described below. Of course, other communication protocols may be used.

In one non-limiting embodiment, the electronic control unit 20 is further configured to interact with:
  radio-frequency (RF) sensors (referenced 22 in FIG. 1) that are installed all around said vehicle 2 to locate said identifier 3. In one non-limiting embodiment, these sensors are UWB or BLE sensors (UWB standing for Ultra-Wide Band).

According to one non-limiting embodiment, said identifier 3 is thus located by means:
  of a UWB or BLE communication if said identifier 3 is a smartphone or a connected object or if the identifier 3 is a key, or
  of an low-frequency (LF) radio-frequency (RF) communication if said identifier 3 is a key, the key then comprising LF transmitters.

Of course, other communication protocols may be used.

It will be recalled that radio-frequency (RF) communications are implemented in a frequency range comprised between 30 MHz and 300 GHz. It will be recalled that UWB communications are implemented in a frequency range comprised between 3.2 GHz and 8.3 GHz with a bandwidth of 500 MHz. It will be recalled that BLE is implemented at 2.4 GHz.

It will be noted that the UWB sensors comprise UWB communication modules and UWB antennas. Likewise, the RF sensors comprise RF communication modules and RF antennas. The non-limiting example of UWB sensors is taken as example throughout the remainder of the description.

Since various locating techniques employing the various UWB, RF and LF communication protocols are known in the art, they are not described here. In one non-limiting embodiment, the locating process is carried out periodically. In one non-limiting example, the locating process is carried out every second. Thus, this makes it possible to detect if the identifier 3 (and therefore its user u) has returned to the predetermined region z1 after having left it for example.

The identifier 3 is described in more detail below.

As illustrated in FIG. 1, the identifier 3 comprises means for recording intention to open a hatch 30, which are also called recording means. In some non-limiting embodiments, said recording means 30 are:
  a microphone, or
  a dedicated application, or
  at least one dedicated button.

Thus, in the case in which the identifier 3 is a key, said recording means 30 are a button or a plurality of buttons dedicated to a given hatch 21. Thus, in the case in which the identifier 3 is a smartphone or a connected object, said recording means 30 are an application or a microphone. In one non-limiting example, the application comprises one or more boxes to be ticked, each of these boxes being dedicated to one hatch 21, such that the user u indicates if she or he wants to open a hatch 21 when she or he is located in the region of proximity z1 of said hatch 21.

As illustrated in FIG. 1, the identifier 3 further comprises a memory 31 in which a command confirming intention to open a hatch cd1, also called the confirming command cd1, may be stored. This means that this confirming command cd1 has been pre-recorded before the user u enters the region of proximity z1 of a hatch 21.

According to some non-limiting embodiments, the confirming command cd1 is a voice message or a confirmation value. Thus, when the recording means 30 is a microphone, the confirming command cd1 is a voice message, whereas when the recording means 30 are an application or at least one button, the confirming command cd1 is a confirmation value.

It will be noted that the confirming command cd1 relates:
  to the confirmation of the intention of the user to open a hatch 21 of the vehicle 2, or
  to the confirmation of the intention of the user not to open a hatch 21 of the vehicle 2.

Thus, the confirming command cd1 may be positive (opening desired) or negative (opening not desired). It confirms the intention of the user u to open a hatch 21 or it confirms her or his intention not to open it, namely to leave it closed.

Thus, in one non-limiting example, the voice message is "open sesame" or "don't open sesame".

Thus, in one non-limiting example, the confirmation value may be equal to 1 for a confirmation to open, or to 0 for a confirmation not to open. When the user u uses an application to confirm her or his intention to open a hatch 21, she or he for example ticks a box in the application to say that she or he confirms her or his intention, this setting the confirmation value to 1. If she or he does not tick this box, this means that she or he confirms her or his intention not to open the hatch 12, or in other words that she or he would like the hatch 21 to remain closed. The application may comprise two boxes, one for the positive confirmation and the other for the negative confirmation. When the user u uses a button to confirm her or his intention to open a hatch 21, she or he depresses the button to say that she or he confirms her or his intention, this setting the confirmation value to 1. If the button is not depressed, this means that she or he confirms her or his intention not to open it, this setting the confirmation value to 0. The identifier 3 may comprise two buttons, one for the positive confirmation and the other for the negative confirmation.

In one non-limiting embodiment, to differentiate between various hatches 21, various voice messages may be used or various values other than 0 and 1 may be used.

In one non-limiting embodiment, the identifier 3 comprises a voice recognition module 32 (illustrated in FIG. 1) configured to analyse the confirming command cd1 when the latter takes the form of a voice message. Either the analysis of the voice message is performed in the identifier 3 (via its voice recognition module 32), or in the motor vehicle 2. In the latter case, the identifier 3 does not need a voice recognition module 31.

In one non-limiting embodiment, the identifier 3 further comprises an interface 33 configured to receive a data message s1 (described below) intended for the user u.

The identifier 3 is configured to authenticate itself with the electronic control unit 20 (function f30(3, 20, Auth) illustrated in FIG. 4). Since various methods for authenticating an identifier 3 are known in the art, they are not described here.

As illustrated in FIG. 1, the identifier 3 is further configured to receive from said electronic control unit 20 a request rq1 for confirmation of intention to open a hatch, also called confirmation request rq1 (function f31(3, 20, rq1) illustrated in FIG. 4).

In one non-limiting embodiment, when said identifier 3 enters the region of proximity z1 around said hatch 21, said identifier 3 is further configured to send a warning signal s2 to a user u of said identifier 3 (function f32(3, u, s2) illustrated in FIG. 4). This makes it possible to apprise the user u that she or he is in the region of proximity z1. In some non-limiting examples of embodiment, the warning signal s2 takes the form of vibration of said identifier 3, of an audio signal, of a voice signal indicating that it is entering a region of proximity z1, or of a visual signal on a screen of said identifier 3, etc. This thus apprises the user u that the hatch 21 may now be opened if the confirming command cd1 has been pre-recorded as positive (described below).

Following receipt of this confirmation request rq1, the identifier 3 is further configured to verify the existence of a command cd1 confirming intention to open a hatch in the memory 31 (function f34(3, 31, cd1) illustrated in FIG. 4), and if the command exists in the memory 31, the identifier 3 is further configured to send to said electronic control unit 20 a command signal msg1 corresponding to said command cd1 confirming intention to open a hatch (function f35(3, 20, msg1(cd1)) illustrated in FIG. 4).

In one non-limiting embodiment, the command signal msg1 is the command cd1 confirming intention to open a hatch itself. Thus, this is either the voice message or the confirmation value. For example, when the voice recognition of the voice message is done by a voice recognition module of the motor vehicle 2, the identifier 3 sends the voice message to the electronic control unit 20 of the motor vehicle 2, which will transmit it to the voice recognition module of the motor vehicle 2 with a view to having it decoded. In another non-limiting embodiment, when the command cd1 confirming intention to open a hatch is a voice message, the command signal msg1 is a confirmation value. For example, when the voice recognition of the voice message is done by the voice recognition module 32 of the identifier 3, the identifier 3 no longer needs to send the entire voice message to the electronic control unit 20 of the motor vehicle 2, and it therefore sends, to the electronic control unit 20, only a confirmation value corresponding to said voice message.

In one non-limiting embodiment, the confirming command cd1 is pre-recorded in the identifier 3 before the user enters the region of proximity z1, i.e. in practice before the user has her or his arms full. It is thus stored in the memory 31 beforehand.

If it does not exist (namely the confirming command cd1 has not been pre-recorded), the identifier 3 is configured to send a data signal s1 to the user u to initiate said command cd1 confirming intention to open a hatch via said means 30 for recording intention to open a hatch (function f36(3, u, 33, s1, cd1) illustrated in FIG. 4). The data signal s1 is sent to the interface 33. Thus, this reminds the user u that she or he has not pre-recorded any confirming command cd1 and that if she or he wants to open the hatch 21 or to leave it closed, she or he may now initiate such a confirming command cd1.

After this confirming command cd1 has been initiated, the identifier 3 sends, to the electronic control unit 20, a corresponding command signal msg1 (function f35 defined above).

It will be noted that, with a view to initiation of the confirming command cd1, in one non-limiting embodiment, the identifier 3 is further configured to activate its microphone 30 (function f37(3, 30, ON) illustrated in FIG. 4). Thus, the identifier 3 is able to receive, via its microphone 30, a confirming command cd1 taking the form of a voice message. The voice message is given by the user u of the identifier 3 as illustrated in FIG. 3. It may also be given by a person located beside said user u. This case may arise if, in one non-limiting example, the user u has her or his arms too full to be able to take her or his identifier 3 in her or his hand.

It will be noted that the identifier 3 comprises an electronic control unit (not illustrated) for performing the functions described above.

The electronic control unit 20 is described in more detail below.

The electronic control unit 20 is configured to authenticate said identifier 3 (function f20(20, 3, Auth) illustrated in FIG. 4).

The electronic control unit 20 is further configured to locate said identifier 3 in a region of proximity z1 around a hatch 21 of said motor vehicle 2 (function f21(20, 3, z1, IN) illustrated in FIG. 4).

FIG. 2 illustrates a user u bearing/wearing said identifier 3 approaching the motor vehicle 2. When she or he is in position p1 the identifier 3 is situated outside of the regions of proximity z1 of the hatches 21. When the user u approaches the motor vehicle 2 and enters a region of proximity z1 associated with a hatch 21 (position p2), here the boot lid or tailgate of the motor vehicle 2, the electronic control unit 20 locates it in this region of proximity z1 by means of the UWB sensors in this given non-limiting example.

When said identifier 3 is located in the region of proximity z1, the electronic control unit 20 is further configured to send to said identifier 3 a request rq1 for confirmation of intention to open a hatch when said identifier 3 enters the region of proximity z1 (function f23(20, 3, rq1) illustrated in FIG. 4). Thus, this confirmation request rq1 is sent as soon as the identifier 3 enters into the region of proximity z1. In one non-limiting embodiment, the electronic control unit 20 is further configured to check whether it has already sent such a confirmation request rq1 to said identifier 3 beforehand (function f24(20, rq1) illustrated in FIG. 4). In the affirmative, it does not resend it. If the identifier 3 is repeatedly detected in the region of proximity z1, this prevents the confirmation request rq1 from being sent each time.

The electronic control unit 20 is further configured to receive from said identifier 3 a command signal msg1 corresponding to said confirming command cd1 pre-recorded or initiated by the user u (function f25(20, 3, msg1(cd1)) illustrated in FIG. 4). Thus, the electronic control unit 20 is able to know the intention of the user u to open or leave closed the boot lid 21 by virtue of the analysis of the command signal msg1 corresponding to the confirming command cd1, to learn if it is positive or if it is negative.

In one non-limiting embodiment, on receipt of the command signal msg1 corresponding to the confirming command cd1, the electronic control unit 20 is further configured to open (function f26(20, 21, OPN) illustrated in FIG. 4) or not open (namely to open or to leave closed) said hatch 21.

Thus, either it opens it, or it does nothing. The hatch 21 either changes to a state st in which it is open (st=OPN), or remains in a state st (closed st=CLSD).

Thus, if the user u of the identifier 3 has her or his arms full of shopping in the non-limiting example given, the hatch 21 automatically opens by itself as illustrated by the dashed arrow in FIG. 3, and the user u does not need to open it herself or himself manually. She or he may thus load her or his shopping into the motor vehicle 2.

In one non-limiting embodiment, if the electronic control unit 20 does not receive any command signal msg1 from the identifier 3, it is further configured to define the confirming command cd1 as having a negative confirmation value and therefore characterize the corresponding command signal msg1 as also being negative (function f27(20, cd1, 0) illustrated in FIG. 4). In this case, the electronic control unit leaves the hatch 21 closed. Specifically, it is possible for the electronic control unit 20 not to receive a command signal msg1 corresponding to a confirming command cd1 from the identifier 3 in the following non-exhaustive cases:

- if the user u does not have the intention to open the hatch 21,
- if the confirming command cd1 is a voice message and the latter is not correctly decoded by the voice recognition module 32,
- if time has passed and the user u has not given a voice message or ticked a box in the dedicated application of the identifier 3 or depressed a dedicated button of the identifier 3.

In one non-limiting embodiment, the electronic control unit 20 is further configured to unlock said hatch 21 if it were locked beforehand, in order to allow it to be opened (function f28(20, 21, d2, DLCK) illustrated in FIG. 4). Unlocking occurs when the identifier 3 is situated at a predetermined distance d2 from the motor vehicle 2 in an unlocking region z2 around said motor vehicle 2, the unlocking region being illustrated in FIG. 2. In one non-limiting embodiment, the predetermined distance d2 is about 2 metres from the motor vehicle 2, in accordance with Thatcham rules. Thus, in one non-limiting embodiment, the electronic control unit 20 is further configured to locate the identifier 3 in an unlocking region z2 (function f30(20, 3, z2, IN) illustrated in FIG. 4). The unlocking region z2 is larger than or equal to the region of proximity z1. In the non-limiting example illustrated, it is larger and encompasses the region of proximity z1. Since such a locating process is known in the art, it is not described here.

It will be noted that in another embodiment (not illustrated), the electronic control unit 20 is configured to transmit the received command signal msg1 (function f29(20, 40, msg1(cd1)) illustrated in FIG. 4) to another electronic control unit referenced 40 in FIG. 1 that is dedicated to opening/closing the hatch 21 and it is the latter that opens or leaves closed the hatch 21 depending on the command signal msg1, and especially depending on the voice message or the confirmation value.

Thus, the described detecting system Sys1 makes it possible to implement a method PR1 for detecting the intention of a user to open a hatch 21 of a vehicle 2, one non-limiting embodiment of this system being described below with reference to FIG. 5 and FIG. 6. In the non-limiting embodiment illustrated, the hatch 21 is the boot lid and it is initially locked. Moreover, in the non-limiting embodiment illustrated, the detecting method PR1 comprises checking to see if the confirmation request rq1 has already been sent beforehand. Furthermore, in the non-limiting embodiment illustrated, the confirming command cd1 is a voice message. The recording means are therefore the microphone. Lastly, in the embodiment illustrated, the electronic control unit is also in charge of opening or not opening the hatch 21 depending on the confirming command cd1.

In a step E1 illustrated F1(20, 3, Auth) in FIG. 5, the electronic control unit 20 authenticates the identifier 3 via a BLE communication in one non-limiting embodiment. This allows the identifier 3 to be paired with the motor vehicle 2. In the case of BLE, pairing occurs when the identifier 3 is located within about 50 metres around the motor vehicle 2.

In a step E2 illustrated F2(20, 3, z2, IN) in FIG. 5, the electronic control unit 31 determines if the identifier 3 is in an unlocking region z2 around the boot lid 21. If the identifier 3 is located in the unlocking region z2 (branch Y0), then, in a step E3 illustrated F3(20, 21, DLCK) in FIG. 5, the electronic control unit 20 unlocks the boot lid 21. Otherwise (branch NO), the locating process continues. It will be noted that no confirmation of intention is required to unlock it. It will be noted that the boot lid 21 is unlocked even if ultimately the user u does not want to open it, namely even if the confirming command cd1 is subsequently negative.

In a step E4 illustrated F4(20, 3, z1, IN) in FIG. 5, the electronic control unit 31 determines if the identifier 3 is in a proximity region z1 around the boot lid 21. Provided that the identifier 3 has not entered the region of proximity z1, the locating process is reiterated (illustrated branch N1). In one non-limiting example, the locating process is carried out every 96 ms (milliseconds). It will be noted that while the identifier 3 is in the region of proximity z1, the locating process is still reiterated. This makes it possible to verify that it is still in said region of proximity z1.

In a step E5 illustrated F5(3, u, s2) in FIG. 5, the identifier 3 sends a warning signal s2 to the user u to indicate thereto that she or he has entered the region of proximity z1 of the boot lid 21.

In a step E6 (branch Y1 illustrated in FIG. 5), when said identifier 3 is located in the region of proximity z1 of the boot lid 21, in one non-limiting embodiment, the electronic control unit 20 checks if it has not already sent to said identifier 3 a confirmation request rq1 to indicate thereto that it has entered the region of proximity z1.

If it has already done so, it does not send it again and it moves on to step E9 (illustrated branch Y2), otherwise (branch N2) in a step E7 illustrated F7(20, 3, rq1) in FIG. 5, the electronic control unit 20 sends to said identifier 3 a confirmation request rq1. In a step E8 illustrated F8(3, 20, rq1) in FIG. 5, the identifier 3 receives this confirmation request rq1 if it has not received it beforehand.

On receipt of said request rq1 for confirmation of intention to open a hatch, in a step E9 in FIG. 5, the identifier 3 verifies the existence of a command cd1 confirming intention to open a hatch in its memory 31 and, if the command is saved in memory (illustrated branch Y3), sends a corresponding confirmation signal msg1 to said electronic control unit 20 (step E10 illustrated F10(3, 20, msg1(cd1)) in FIG. 6) which receives it (step E11 illustrated F11(20, 3, msg1 (cd1)) in FIG. 6).

If said command does not exist (illustrated branch N3), namely if there is no confirming command cd1 pre-recorded in memory, in a step E12 illustrated F12(3, 33, Si) in FIG. 6, the identifier 3 sends, via its interface 33, a data signal s1 to the user u of said identifier 3 to initiate said command cd1 confirming intention to open a hatch via said means 30 for recording intention to open a hatch. Thus, the user u is apprised that she or he may initiate such a confirming command cd1 and show that she or he wants the boot lid 21 to open or to remain closed. In a step E13 illustrated F13(3, 30, ON) in FIG. 6, in the embodiment employing the microphone 30, the latter is then activated by the identifier 3. It will be noted that the microphone 30 is still activated when the confirming command cd1 does not exist because it is not known whether the user u will use the microphone or the dedicated application to confirm her or his intention to open the boot lid 21 or not, namely which recording means 30 she or he will use to initiate the confirming command cd1. It will be noted that steps E9 and E10 are performed in parallel in one non-limiting embodiment, or in any order.

In the non-limiting example where the recording means 30 are the microphone, to open the boot lid 21, the user u speaks into the microphone 30; a voice message such as "open sesame" is thus transmitted via the microphone 30. To leave the boot lid 21 closed, the user u speaks into the microphone 30; a voice message such as "don't open sesame" is thus transmitted via the microphone 30.

If the confirming command cd1 has been initiated by the user u (branch Y4 illustrated in FIG. 6), the identifier 3 sends the corresponding command signal msg1 to said electronic control unit 20 (step E10) which receives it (step E11). Thus, the electronic control unit 20 detects the intention of the user u to open or the boot lid 21 or not via the confirming command cd1. By analysing it, it is able to see whether it is positive or negative.

On receipt of the command signal msg1, if it corresponds to a positive confirming command cd1 (branch Y5 illustrated in FIG. 6), in a step E14 illustrated F14(20, 21, OPN) in FIG. 6, the electronic control unit 20 opens the boot lid 21. The electronic control unit is able to do so because the boot lid was unlocked beforehand. Thus, the boot lid 21 is opened automatically without the intervention of the user u. It is in an open state st: st referenced OPN illustrated in FIG. 6.

On receipt of the command signal msg1, if it corresponds to a negative confirming command cd1 (branch N5 illustrated in FIG. 6), the electronic control unit 20 does not open the boot lid 21. Thus, the boot lid 21 remains closed. It remains in a closed state st: st referenced CLSD illustrated in FIG. 6.

If the confirming command cd1 is not initiated by the user u (branch N4 illustrated in FIG. 6) (whether via its microphone or via an application or via a button because she or he does not have the intention to open the hatch 21 or because the voice message is not correctly decoded by the voice recognition module 32 in one non-limiting example or because she or he takes too long to initiate the confirming command cd1), then, in a step E14' illustrated F14'(20, cd1, 0) in FIG. 6, the electronic control unit 20 defines the confirmation command cd1 as being negative, namely that the user u does not have the intention of opening the hatch 21. Therefore, the corresponding command signal msg1 is considered to also be negative. The confirmation value is then set to 0. In this case, the electronic control unit 20 does not open said hatch 21, here the boot lid or tailgate of the motor vehicle 2. Thus, it remains in the closed state st (st=CLSD shown in FIG. 6).

It will be noted that, in another non-limiting embodiment, when the identifier 3 is a key, there is no step E10 of activating a microphone. If the confirming command cd1 is not pre-recorded, the electronic control unit 20 waits for the user u to initiate the confirming command cd1 via a button as described above.

Of course the described invention is not limited to the embodiments described above and to the field described above. Thus, in one non-limiting embodiment, the identifier 3 comprises a plurality of microphones 30.

Thus, the described invention especially has the following advantages:

it allows a hatch 21 to be automatically opened reliably, no manual intervention by the user u being required to open the hatch 21, with respect to a solution that might integrate recognition of a confirmation command cd1 taking the form of a voice message delivered via microphones placed in the vehicle 2, it allows such microphones to be removed from the vehicle 2, this allowing the cost of the detecting system Sys1 to be decreased; it will be noted that the cost is all the lower given that the identifiers 3 such as smartphones for example already comprise integrated voice recognition systems and an integrated microphone; moreover, this makes it possible to reduce problems with spurious noises that may arise with the solution in which the microphones are integrated in the vehicle 2, the user u in this case being very far from said microphones, in contrast to the solution of the invention which allows a confirmation command cd1, which in one non-limiting embodiment is a voice message, to be pre-recorded or initiated in the immediate vicinity of the microphone of the identifier 3 (for example via earphones or directly with the mouth brought close to the microphone), because the pre-recording or initiation of the confirmation command cd1 is done via the identifier 3 and no longer via the vehicle 2, it allows the intention of the user to open or not open a hatch 21 to be detected with certainty, it makes it possible to avoid the need to equip the vehicle 2 with a kick sensor, such sensors being very sensitive to the least movement and being able to detect spurious movements, such as a cat passing, which cause a hatch 21 such as the boot lid or tailgate to open undesirably; thus, by virtue of the solution of the invention, the cost of the vehicle 2 is decreased because it does not possess such a movement sensor, it is simple to implement.

The invention claimed is:

1. A system for detecting an intention of a user to open a hatch of a vehicle, detecting system comprising:
   an identifier comprising means for recording intention to open a hatch and being configured to:
     authenticate itself with an electronic control unit,
     when the identifier is located in a region of proximity around the hatch, receive from the electronic control unit a request for confirmation of intention to open a hatch,
     following receipt of the request for confirmation of intention to open a hatch, verify a command confirming intention to open a hatch is stored in a memory in the identifier,
     if the command confirming intention to open a hatch is stored, send to the electronic control unit a command signal corresponding to the command confirming intention to open a hatch,
     if the command is not stored, send a data signal to a user of the identifier to initiate the command confirming intention to open a hatch via the means for recording intention to open a hatch,
     when the command confirming intention to open a batch is initiated, send to the electronic control unit a command signal corresponding to the command confirming intention to open a hatch,
   the electronic control unit being integrated in the vehicle and being configured to:

authenticate the identifier,
locate the identifier in a region of proximity around the hatch,
when the identifier is located in the region of proximity, send to the identifier the request for confirmation of intention to open a hatch,
receive the command signal corresponding to the command-confirming intention to open a hatch.

2. The detecting system according to claim 1, wherein the electronic control unit is further configured to open or not open the hatch depending on the command signal.

3. The detecting system according to claim 1, wherein the command confirming intention to open a hatch that is stored is pre-recorded in the identifier.

4. The detecting system according to claim 1, wherein the command confirming intention to open a hatch is a voice message or a confirmation value.

5. The detecting system according to claim 4, wherein the command signal corresponds to the command confirming intention to open a hatch.

6. The detecting system according to claim 4, wherein the command signal is a confirmation value when the command confirming intention to open a hatch is a voice message.

7. The detecting system according to claim 1, wherein the means for recording intention to open a hatch are:
   a microphone, or
   an application, or
   at least one button.

8. The detecting system according to claim 1, wherein when the identifier enters the region of proximity around the hatch, the identifier is further configured to send a warning signal to a user of the identifier.

9. The detecting system according to claim 1, wherein if the electronic control unit does not receive from the identifier a command signal, it is further configured to consider the command signal as corresponding to a negative command confirming intention to open a hatch.

10. The detecting system according to claim 1, wherein the identifier is an identifier of hands-free access of the vehicle for accessing and/or starting vehicle hands free.

11. The detecting system according to claim 1, wherein the hatch is a boot lid or tailgate or a door of the vehicle.

12. The detecting system according to claim 1, wherein the identifier is a key, a smartphone, or a connected object.

13. An identifier for a vehicle, the identifier being configured to interact with an electronic control unit, the identifier comprising means for recording intention to open a hatch and being configured to:
   authenticate itself with the electronic control unit, the latter being integrated in the vehicle,
   when it is located in a region of proximity around a hatch of the vehicle, receive from the electronic control unit a request for confirmation of intention to open a hatch,
   following receipt of the request for confirmation of intention to open a hatch, verify a command confirming intention to open a hatch is stored in a memory in the identifier,
   if the command confirming intention to open a hatch is stored, send to the electronic control unit a command signal corresponding to the command confirming intention to open a hatch,
   if the command is not stored, send a data signal to a user of the identifier to initiate the command confirming intention to open a hatch via the means for recording intention to open a hatch,
   when the command confirming intention to open a hatch is initiated, send to the electronic control unit a command signal corresponding to the command confirming intention to open a hatch.

14. An electronic control unit configured to interact with an identifier, the electronic control unit being integrated in a vehicle and being configured to:
   authenticate the identifier,
   locate the identifier in region of proximity around a hatch of the vehicle,
   when the identifier is located in the region of proximity around the hatch, send to the identifier a request for confirmation of intention to open a hatch,
   if a command confirming intention to open a hatch is verified by the identifier as being stored in a memory in the identifier, receive from the identifier a command signal relating to a command confirming intention to open a hatch, and
   if the command is not stored, receive from the identifier a command signal corresponding to a command confirming intention to open a hatch if a user initiates the command confirming intention to open a hatch via a means for recording intention to open a hatch.

15. A method for detecting an intention of a user to open a hatch of a vehicle, the vehicle comprising an electronic control unit configured to interact with an identifier, the detecting method comprising:
   the electronic control unit authenticating the identifier,
   the electronic control unit locating the identifier in a region of proximity around the hatch,
   when the identifier is located in the region of proximity around the hatch, the electronic control unit sending to the identifier a request for confirmation of intention to open a hatch and the identifier receiving the request for confirmation of intention to open a hatch,
   on receipt of the request for confirmation of intention to open a hatch, the identifier verifying a command confirming intention to open a hatch is stored in a memory in the identifier and, if the command is stored, sending to the electronic control unit a corresponding command signal to open a hatch,
   if the command is not stored, the identifier sending a data signal to a user of the identifier to initiate the command confirming intention to open a hatch via the means for recording intention to open a hatch,
   when the command confirming intention to open a batch is initiated, the identifier sending to the electronic control unit a command signal corresponding to the command confirming intention to open a hatch,
   the electronic control unit receiving the command signal.

* * * * *